(12) United States Patent
　　Kim et al.

(10) Patent No.:　US 12,639,298 B2
(45) Date of Patent:　　May 26, 2026

(54) DATA PROCESSING ACCELERATION APPARATUS

(71) Applicant: XCENA Inc., Seongnam-si (KR)

(72) Inventors: Juhyun Kim, Yongin-si (KR); Jin Yeong Kim, Yongin-si (KR)

(73) Assignee: XCENA Inc., Seongnam-si (KR)

( * ) Notice: Subject to any disclaimer, the term of this patent is extended or adjusted under 35 U.S.C. 154(b) by 0 days.

(21) Appl. No.: 18/769,510

(22) Filed: Jul. 11, 2024

(65) Prior Publication Data

US 2025/0021551 A1　　Jan. 16, 2025

(30) Foreign Application Priority Data

Jul. 12, 2023　(KR) ......................... 10-2023-0090249
Oct. 6, 2023　(KR) ......................... 10-2023-0133627

(51) Int. Cl.
　　*G06F 16/2453*　　(2019.01)
　　*G06F 13/38*　　(2006.01)
　　*G06F 13/42*　　(2006.01)
　　*G06F 16/22*　　(2019.01)

(52) U.S. Cl.
　　CPC ........ *G06F 16/2453* (2019.01); *G06F 13/382* (2013.01); *G06F 13/4221* (2013.01); *G06F 16/2237* (2019.01); *G06F 2213/0026* (2013.01)

(58) Field of Classification Search
　　CPC .............. G06F 16/2453; G06F 13/382; G06F 13/4221; G06F 16/2237; G06F 2213/0026; G06F 16/3338; G06F 3/0688
　　USPC .............. 707/706, 715, 722, 723, 758, 769, 707/999.003, 999.002
　　See application file for complete search history.

(56) References Cited

U.S. PATENT DOCUMENTS

| | | | |
|---|---|---|---|
| 2022/0137865 A1 | 5/2022 | Lee et al. | |
| 2024/0221738 A1* | 7/2024 | Garg | ..................... G10L 13/033 |
| 2024/0330341 A1* | 10/2024 | Xie | ..................... G06F 16/3338 |
| 2024/0406166 A1* | 12/2024 | Bell | ..................... G06N 3/045 |
| 2024/0419706 A1* | 12/2024 | Gutierrez | .............. G06F 40/166 |

(Continued)

FOREIGN PATENT DOCUMENTS

KR　　10-2022-0056986 A　　5/2022

OTHER PUBLICATIONS

Choi et al.; "Advancing Processor-in-Memory (PIM) Technology: A Response to the Computational Demands of Large Language Models (LLM)"; SoC Platform Research Center, Semiconductor and Display R&D Division Korea Electronics Technology Institute (KETI); Jun. 30, 2023; pp. 2294-2296.

(Continued)

*Primary Examiner* — Md I Uddin
(74) *Attorney, Agent, or Firm* — Studebaker Brackett PLLC

(57)　　　　　ABSTRACT

A data processing acceleration apparatus is disclosed. The data processing acceleration apparatus comprises a hardware accelerator, a memory device, and a memory controller configured to control the hardware accelerator and the memory device. And the memory controller includes a plurality of computing units, a first interface configured to communicate with a host processor based on a first protocol, a second interface configured to communicate with the memory device based on a second protocol, and a third interface configured to communicate with the hardware accelerator based on a third protocol.

8 Claims, 9 Drawing Sheets

(56) References Cited

U.S. PATENT DOCUMENTS

2025/0156356 A1 * 5/2025 Paul ...................... G06F 3/0688

OTHER PUBLICATIONS

"Design and Practice of Al-oriented General-purpose Vector Database Systems"; Vector Database for AI; <https://medium.com/vector-database;> Nov. 8, 2021; pp. 1-13.

* cited by examiner

800

S810

RECEIVE QUERY EMBEDDING FROM HOST PROCESSOR

S820

PERFORM VECTOR SEARCH PROCESS ON EMBEDDING VECTOR DATA INCLUDED IN VECTOR DATABASE BASED ON QUERY EMBEDDING

S830

TRANSMIT RESULT OF VECTOR SEARCH PROCESS TO HOST PROCESSOR

900

S910

RECEIVE QUERY EMBEDDING FROM HOST PROCESSOR

S920

PERFORM VECTOR SEARCH PROCESS ON EMBEDDING VECTOR DATA
INCLUDED IN VECTOR DATABASE BASED ON QUERY EMBEDDING

S930

TRANSMIT, TO HARDWARE ACCELERATOR,
SOME OF PARAMETERS OF LLM, SOME OF LATENT VARIABLES OF LLM,
RESULT OF VECTOR SEARCH PROCESS, AND QUERY EMBEDDING

S940

RECEIVE LLM OUTPUT FROM HARDWARE ACCELERATOR

S950

TRANSMIT LLM OUTPUT TO HOST PROCESSOR

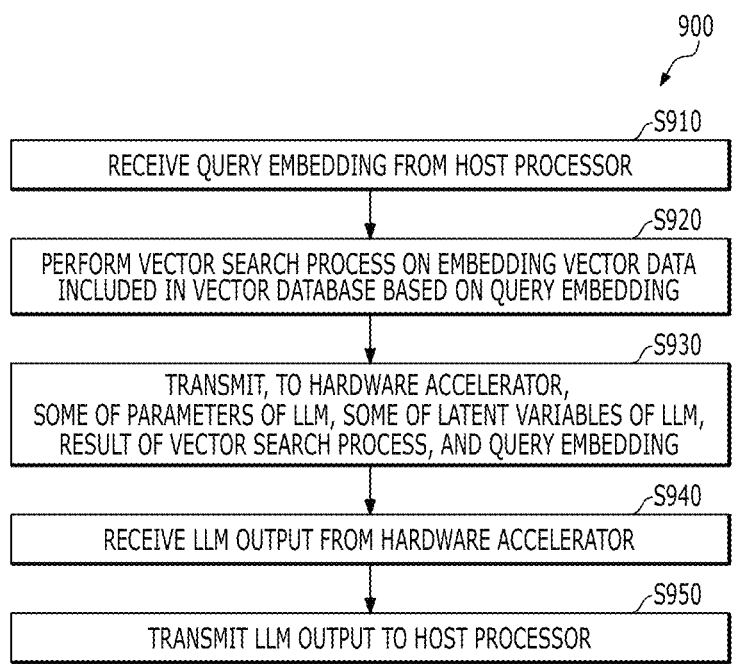

FIG. 9

DATA PROCESSING ACCELERATION APPARATUS

CROSS-REFERENCE TO RELATED APPLICATIONS

This application claims priority to Korean Patent Application No. 10-2023-0090249, filed in the Korean Intellectual Property Office on Jul. 12, 2023, and Korean Patent Application No. 10-2023-0133627, filed in the Korean Intellectual Property Office on Oct. 6, 2023, the entire contents of which are hereby incorporated by reference.

BACKGROUND

Field

The present disclosure relates to a data processing acceleration apparatus.

Description of Related Art

In recent years, along with the development of artificial intelligence, the size of artificial intelligence models has increased, requiring processing of an explosively increasing amount of data through the artificial intelligence models. For this reason, it is required to ensure a storage space for storing the data that has to be processed through the artificial intelligence model, and the parameters necessary for the artificial intelligence model.

In addition, for the artificial intelligence model such as Large Language Model (LLM) where frequent training is not allowed, it is not possible to immediately reflect additional information including the up-to-date information, and in this case, it is possible to perform inference reflecting the additional information by using a database associated with the artificial intelligence model. Accordingly, it is also required to ensure a storage space for constructing the database associated with the artificial intelligence model.

SUMMARY

In order to solve one or more problems (e.g., the problems described above and/or other problems not explicitly described herein), the present disclosure provides a data processing acceleration apparatus.

The present disclosure may be implemented in a variety of ways, including a method, an apparatus (system), or a non-transitory computer-readable recording medium storing instructions.

According to an aspect of the present disclosure, a data processing acceleration apparatus may comprise a hardware accelerator, a memory device and a memory controller configured to control the hardware accelerator and the memory device, and the memory controller may include a plurality of computing units, a first interface configured to communicate with a host processor based on a first protocol, a second interface configured to communicate with the memory device based on a second protocol, and a third interface configured to communicate with the hardware accelerator based on a third protocol.

According to an aspect of the present disclosure, the hardware accelerator may be at least one of a Neural Processing Unit (NPU) or a Graphic Processing Unit (GPU) configured to execute a Large Language Model (LLM).

According to an aspect of the present disclosure, the memory device may store a vector database, and the vector database may include parameters of the LLM, latent variables of the LLM, and embedding vector data associated with information not used for training the LLM.

According to an aspect of the present disclosure, the memory controller may be configured to receive a query embedding from the host processor through the first interface, perform a vector search process for the embedding vector data included in the vector database based on the query embedding, and transmit some of the parameters of the LLM, some of the latent variables of the LLM, a result of the vector search process, and the query embedding to the hardware accelerator through the third interface, and the hardware accelerator may be configured to generate an output of the LLM based on some of the parameters of the LLM, some of the latent variables of the LLM, the result of the vector search process, and the query embedding.

According to an aspect of the present disclosure, the plurality of computing units may include one or more hardware devices configured to accelerate a vector search process on a vector database stored in the memory device.

According to an aspect of the present disclosure, the memory controller may be configured to receive a query embedding from the host processor through the first interface, perform a vector search process on a vector database stored in the memory device based on the query embedding, and transmit a result of the vector search process to the host processor through the first interface, or transmit the result of the vector search process and the query embedding to the hardware accelerator through the third interface.

According to an aspect of the present disclosure, the hardware accelerator may be configured to generate an output of a Large Language Model (LLM) based on the result of the vector search process and the query embedding, and the memory controller may be configured to receive the output of the LLM from the hardware accelerator through the third interface and transmit the output of the LLM to the host processor through the first interface.

According to an aspect of the present disclosure, the first interface may be a Compute eXpress Link (CXL) interface, the second interface may be a Dual Data Rate (DDR) interface, and the third interface may be a Peripheral Component Interconnect Express (PCIe) interface or a Universal Chiplet Interconnect Express (UCIe) interface.

According to an aspect of the present disclosure, an operation of updating vector data and deleting some vector data for the vector database may be performed by the host processor.

According to an aspect of the present disclosure, the data processing acceleration apparatus may further comprise a storage device, the memory controller may further include a fourth interface configured to communicate with the storage device based on a fourth protocol, the storage device may store a vector database, and the memory device may operate as a cache for the storage device.

According to an aspect of the present disclosure, the data processing acceleration apparatus may further comprise an additional hardware accelerator, an additional memory device, and an additional memory controller configured to control the additional hardware accelerator and the additional memory device, the additional memory controller may include a plurality of additional computing units, a fifth interface configured to communicate with the host processor based on the first protocol, a sixth interface configured to communicate with the additional memory device based on the second protocol, a seventh interface configured to communicate with the additional hardware accelerator based on the third protocol, and an eighth interface configured to communicate with the storage device based on the fourth protocol, and the additional memory device may operate as a cache for the storage device.

According to an aspect of the present disclosure, vector data stored in the vector database may operate in a read-only mode when at least one of the memory controller or the additional memory controller performs a vector search process on a vector database stored in the storage device, According to an aspect of the present disclosure, the memory controller may operate as a master device, and the additional memory controller may operate as a subordinate device when the host processor updates a vector database stored in the storage device, the host processor may update the vector database stored in the storage device through the memory controller, and reading and writing operations with respect to the vector database stored in the storage device of the additional memory controller may be prohibited.

According to an aspect of the present disclosure, a data processing acceleration apparatus may comprise a memory device and a memory controller configured to control the memory device, and the memory controller may include a plurality of computing units, a first interface configured to communicate with a host processor based on a first protocol, and a second interface configured to communicate with the memory device based on a second protocol.

According to an aspect of the present disclosure, the plurality of computing units may include one or more hardware devices configured to accelerate a vector search process on a vector database stored in the memory device.

According to some aspects of the present disclosure, it is possible to secure a storage space for the data associated with the artificial intelligence model and also increase data throughput and processing speed, by storing the database associated with the artificial intelligence model (e.g., LLM) in the memory device included in the data processing acceleration apparatus and accelerating search on database through a memory controller included in the data processing acceleration apparatus.

The effects of the present disclosure are not limited to the effects described above, and other effects not described herein can be clearly understood by those of ordinary skill in the art (referred to as "ordinary technician") from the description of the claims.

BRIEF DESCRIPTION OF THE DRAWINGS

The above and other objects, features and advantages of the present disclosure will be described with reference to the accompanying drawings described below, where similar reference numerals indicate similar elements, but not limited thereto, in which:

FIG. 9 is a diagram provided to explain a method for processing a search for data included in a database associated with an artificial intelligence model and outputting from an LLM.

DETAILED DESCRIPTION

Figure 1:
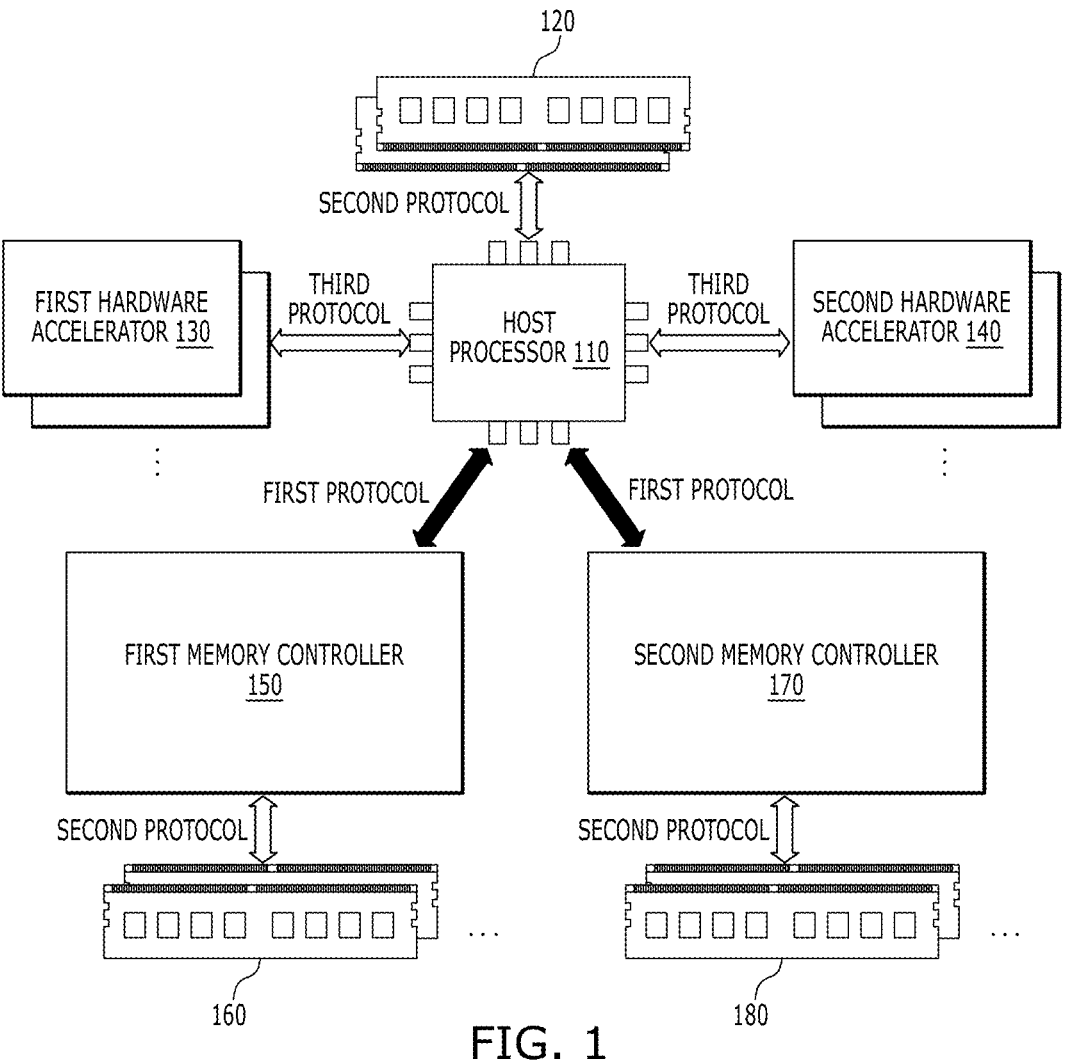
FIG. 1 is a diagram provided to explain a data processing system including a data processing acceleration apparatus.

Hereinafter, example details for the practice of the present disclosure will be described in detail with reference to the accompanying drawings. However, in the following description, detailed descriptions of well-known functions or configurations will be omitted if it may make the subject matter of the present disclosure rather unclear.

In the accompanying drawings, the same or corresponding components are assigned the same reference numerals. In addition, in the following description of various examples, duplicate descriptions of the same or corresponding components may be omitted. However, even if descriptions of components are omitted, it is not intended that such components are not included in any example.

Advantages and features of the disclosed examples and methods of accomplishing the same will be apparent by referring to examples described below in connection with the accompanying drawings. However, the present disclosure is not limited to the examples disclosed below, and may be implemented in various forms different from each other, and the examples are merely provided to make the present disclosure complete, and to fully disclose the scope of the disclosure to those skilled in the art to which the present disclosure pertains.

The terms used herein will be briefly described prior to describing the disclosed example(s) in detail. The terms used herein have been selected as general terms which are widely used at present in consideration of the functions of the present disclosure, and this may be altered according to the intent of an operator skilled in the art, related practice, or introduction of new technology. In addition, in specific cases, certain terms may be arbitrarily selected by the applicant, and the meaning of the terms will be described in detail in a corresponding description of the example(s). Accordingly, the terms used in this disclosure should be defined based on the meaning of the term and the overall content of the present disclosure, rather than simply the name of the term.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it is intended as meaning that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to play one or more processors. Accordingly, as an example, the "module" or "unit" may include components such as software components, object-oriented software components, class components, and task components, and at least one of processes, functions, attributes, procedures, subroutines, program code segments, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

A "module" or "unit" may be implemented as a processor and a memory, or may be implemented as a circuit (circuitry). Terms such as circuit and circuitry may refer to circuits in hardware, but may also refer to circuits in software. The "processor" should be interpreted broadly to encompass a general-purpose processor, a central processing unit (CPU), a microprocessor, a digital signal processor (DSP), a neural processing unit (NPU), a controller, a microcontroller, a state machine, etc. Under some circumstances, the "processor" may refer to an application-specific integrated circuit (ASIC), a programmable logic device (PLD), a field-programmable gate array (FPGA), etc. The "processor" may refer to a combination for processing devices, e.g., a combination of a DSP and a microprocessor, a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. The memory is said to be in electronic communication with a processor if the processor can read information from and/or write information to the memory. The memory integrated with the processor is in electronic communication with the processor.

In addition, terms such as first, second, A, B, (a), (b), etc. used in the following examples are only used to distinguish certain components from other components, and the nature, sequence, order, etc. of the components are not limited by the terms.

In addition, in the following examples, if a certain component is stated as being "connected," "combined" or "coupled" to another component, it is to be understood that there may be yet another intervening component "connected," "combined" or "coupled" between the two components, although the two components may also be directly connected or coupled to each other.

In addition, as used in the following examples, "comprise" and/or "comprising" does not foreclose the presence or addition of one or more other elements, steps, operations, and/or devices in addition to the recited elements, steps, operations, or devices.

A "Large Language Model (LLM)" as used herein may refer to a language model that is capable of inference without fine-tuning, and that may have 10 times more parameters (e.g., more than 100 billion parameters, etc.) than the related general language model. For example, the LLM may be a Generative Pretrained Transformer (GPT), a Bard, etc. In the present disclosure, the LLM may be referred to as a "language model".

Hereinafter, various examples of the present disclosure will be described in detail with reference to the accompanying drawings.

FIG. 1 is a diagram provided to explain a data processing system including a data processing acceleration apparatus. Referring to FIG. 1, the data processing system may include a host processor 110, one or more first memory devices 120, one or more hardware accelerators 130 and 140, and one or more data processing acceleration apparatuses. Meanwhile, the configuration of the data processing system is not limited to the above. According to various aspects, the data processing system may omit at least one of the components described above, and may further include at least one other component. For example, the data processing system may further include a communication circuit for communication with an external device. The data processing system may be a server for providing an LLM-based service.

The host processor 110 may be a processor core configured to control overall operations of the data processing system. For example, the host processor 110 may be configured to interpret instructions of an operating system or various programs running on the data processing system and process data. The host processor 110 may be a central processing unit (CPU).

The one or more first memory devices 120 may store various data used by one or more components (e.g., the host processor 110) of the data processing system. For example, the data may include input data or output data for software (e.g., a program) and a command related to the same. The one or more first memory devices 120 may communicate with the host processor 110. The one or more first memory devices 120 may include a volatile memory and/or a non-volatile memory. The one or more first memory devices 120 may be a dual in-line memory module (DIMM)-based memory and may directly communicate with the host processor 110. For example, the one or more first memory devices 120 may include a memory that exchanges data through an interface based on a second protocol (e.g., a Dual Data Rate (DDR) protocol). The one or more first memory devices 120 may be referred to as a "host memory".

The one or more hardware accelerators 130 and 140 may include a hardware configuration for quickly and efficiently processing a specific task or operation in the data processing system. The one or more hardware accelerators 130 and 140 may include an operator or a processor configured to perform an artificial intelligence operation. For example, the one or more hardware accelerators 130 and 140 may include at least one of a Neural Processing Unit (NPU) or a Graphic Processing Unit (GPU) configured to execute the Large Language Model (LLM). The one or more hardware accelerators 130 and 140 may communicate with the host processor 110 through an interface based on a third protocol (e.g., a Peripheral Component Interconnect Express (PCIe) or a Universal Chiplet Interconnect Express (UCIe) protocol, etc.). The one or more hardware accelerators 130 and 140 may include a memory device (not illustrated) directly connected thereto.

The one or more data processing acceleration apparatuses may correspond to an accelerator that supports a Compute Express Link (CXL) specification, a memory buffer for a memory expander, or a combination of both.

The one or more data processing acceleration apparatuses may operate under the control of the host processor 110. The one or more data processing acceleration apparatuses may communicate with the host processor 110 through an interface based on a first protocol (e.g., a CXL protocol). For example, the one or more data processing acceleration apparatuses may be connected to the host processor 110 through an interface based on the CXL protocol. In addition, the data processing acceleration apparatus may include second memory devices 160 and 180, and perform an operation acceleration function on the corresponding memory devices. In this case, the one or more data processing acceleration apparatuses may be referred to as a "CXL computational memory". The one or more data processing acceleration apparatuses may be perceived as an extension of a general memory in the host, and thus can support the lack of in-memory space in the vector database.

Meanwhile, a vector database application program running on the host processor 110 may be allocated a memory space in the one or more data processing acceleration apparatuses to store the vector data. In this case, the operations of storing new data in the vector database, updating the data, or deleting some data, etc. may be performed by the host processor 110. Meanwhile, the expansion of the memory space provided by the one or more data processing acceleration apparatuses may allow storage of more data, which may further increase the complexity and response time of the vector search operation. In addition, although memory space is increased, there is a limit to performing graph index search that requires random pointer search due to the limitation of the number of CPU cores that can be mounted on one device (e.g., server), and the memory (e.g., the second memory devices 160 and 180) extended with the CXL interface has a higher latency than the related main memories (e.g., the first memory device 120), which may waste CPU cycles and increase response delay time, making it difficult to expect high performance. To solve this problem, the one or more data processing acceleration apparatuses may perform and accelerate the vector search operation using a plurality of computing units. Accordingly, the one or more data processing acceleration apparatuses may achieve high search throughput by overcoming the limitation of the number of CPU cores and additionally securing the computing units in response to an increase in the memory space. In addition, when the one or more data processing acceleration apparatuses approach the device memory (e.g., the second memory devices 160 and 180), it is possible to support to achieve lower latency and higher performance by avoiding the CXL interface with high latency.

The one or more data processing acceleration apparatuses may include one or more second memory devices 160 and 180 and memory controllers 150 and 170 configured to control the one or more second memory devices 160 and 180. Although FIG. 1 illustrates that the data processing system includes two data processing acceleration apparatuses, with one data processing acceleration apparatus including the first memory controller 150 and the second memory device 160, and the other data processing acceleration apparatus including the second memory controller 170 and the second memory device 180, but the number of data processing acceleration apparatus included in the data processing system is not limited thereto.

The one or more second memory devices 160 and 180 may include a volatile memory and/or a non-volatile memory. The one or more second memory devices 160 and 180 may be a DIMM-based memory and may directly communicate with the memory controllers 150 and 170. For example, the one or more second memory devices 160 and 180 may include a memory that exchanges data through an interface based on the second protocol (e.g., a DDR protocol). The one or more second memory devices 160 and 180 may be referred to as a "device memory".

The one or more second memory devices 160 and 180 may store a vector database. The vector database may include embedding vector data associated with parameters of the LLM, latent variables of the LLM, and information (e.g., new information after LLM training) not used for training the LLM. The "embedding" may represent a process of converting a linguistic expression used by a person into a number that a computer can understand. The embedding may be expressed in the form of a vector having multiple dimensions because it is difficult to express various meanings of a language with only a single number, and this vector may be referred to as an "embedding vector". For example, through embedding, various information expressed in language can be thought of as a point in the vector space that the computer can understand, and information with semantic similarity in the vector space can be positioned close to each other. In addition, the vector database may represent a database that stores and manages various information including additional information (e.g., up-to-date information) in the vector space, and may be mainly used for semantic search. For example, for the LLM, in order to receive additional information, a query may be converted into a vector in a numerical form that the model can understand, and a vector search may be performed on the vector database including information (e.g., new or up-to-date information) not used for training the LLM to find information with high similarity.

The memory controllers 150 and 170 may be configured to control the one or more second memory devices 160 and 180. To this end, the memory controllers 150 and 170 may include a plurality of computing units, a first interface configured to communicate with the host processor 110 based on the first protocol, and a second interface configured to communicate with the one or more second memory devices 160 and 180 based on the second protocol.

The plurality of computing units may include one or more hardware devices configured to accelerate the vector search process on the vector database stored in the one or more second memory devices 160 and 180. The plurality of computing units may include a plurality of independent cores and accessory devices. In the pointer search process of the linked list-based data structure, since there is no way to know in advance the position of a subsequent memory access, the core has to wait during the memory access latency, which may degrade performance. In addition, if there are a small number of cores, a situation may occur where most cores are tied up in the memory latency and are wasted. In some aspects, because the one or more data processing acceleration apparatuses use a plurality of independent cores, each of the cores may be able to perform pointer search independently, and some cores may perform operations while the other cores are waiting, thus supporting to achieve higher performance. In addition, the accessory device included in the plurality of computing units may include a hardware device that accelerates calculation of vector similarity, and may support some or all operations of vector similarity operation functions (e.g., a Euclidean similarity operation function or a cosine similarity operation function).

Figure 2:
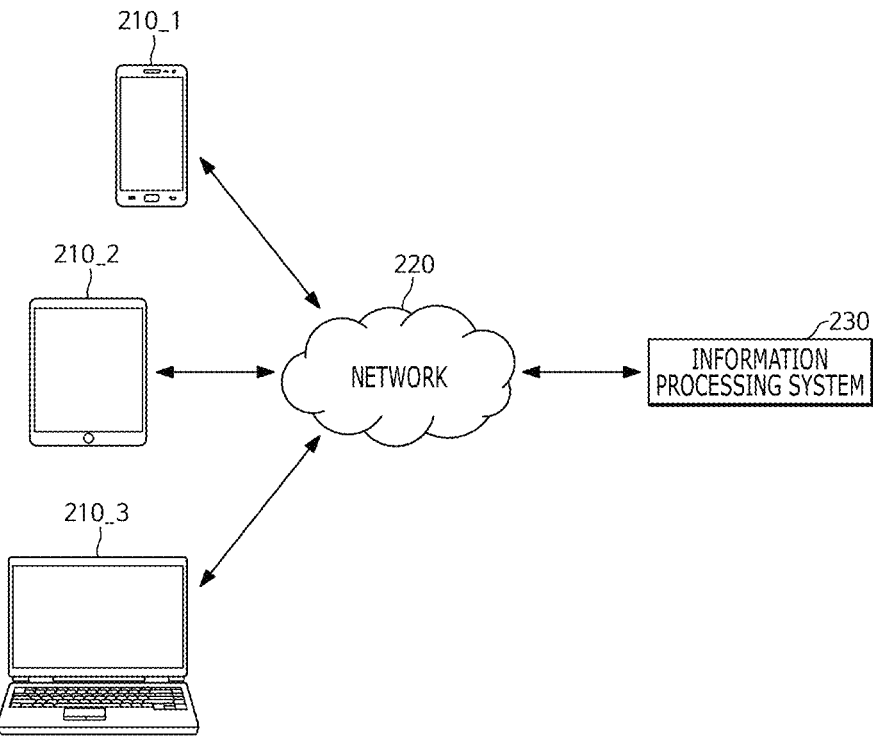
FIG. 2 is a schematic diagram of a configuration in which an information processing system is communicatively connected to a plurality of user terminals in relation to data processing.

FIG. 2 is a schematic diagram of a configuration in which an information processing system 230 is communicatively connected to a plurality of user terminals 210_1, 210_2 and 210_3 in relation to data processing. The information processing system 230 may include a system(s) that can provide a data processing service (e.g., an LLM-based service). The information processing system 230 may include one or more server devices and/or databases, or one or more distributed computing devices and/or distributed databases based on cloud computing services, which are capable of storing, providing and executing computer-executable programs (e.g., downloadable applications) and data relating to a data processing service. For example, the information processing system 230 may include separate systems (e.g., servers) for the data processing service.

The data processing service which is provided by the information processing system 230, may be provided to the user via a data processing application, a web browser application, and the like installed in each of a plurality of user terminals 210_1, 210_2, and 210_3.

A plurality of user terminals 210_1, 210_2, and 210_3 may communicate with the information processing system 230 through a network 220. The network 220 may be configured to enable communication between a plurality of user terminals 210_1, 210_2, and 210_3 and the information processing system 230. The network 220 may be configured as a wired network such as Ethernet, a wired home network (Power Line Communication), a telephone line communication device and RS-serial communication, a wireless network such as a mobile communication network, a wireless LAN (WLAN), Wi-Fi, Bluetooth, and ZigBee, or a combination thereof, depending on the installation environment. The method of communication is not limited, and may include a communication method using a communication network (e.g., mobile communication network, wired Internet, wireless Internet, broadcasting network, satellite network, and so on) that may be included in the network 220 as well as short-range wireless communication between the user terminals 210_1, 210_2, and 210_3.

For example, the plurality of user terminals 210_1, 210_2 and 210_3 may transmit a data processing request and a command associated with a user request for data processing to the information processing system 230 through the network 220, and the information processing system 230 may receive the request and the command.

In FIG. 2, a mobile phone terminal 210_1, a tablet terminal 210_2, and a PC terminal 210_3 are illustrated as the examples of the user terminals, but aspects are not limited thereto, and the user terminals 210_1, 210_2 and 210_3 may be any computing device that is capable of wired and/or wireless communication and that can be installed with the data processing application, and so on and execute the same. For example, the user terminal may include a smartphone, a mobile phone, a navigation system, a computer, a notebook computer, a digital broadcasting terminal, Personal Digital Assistants (PDA), a Portable Multimedia Player (PMP), a tablet PC, a game console, a wearable device, an internet of things (IoT) device, a virtual reality (VR) device, an augmented reality (AR) device, and the like. In addition, FIG. 2 illustrates that three user terminals 210_1, 210_2, and 210_3 are in communication with the information processing system 230 through the network 220, but aspects are not limited thereto, and a different number of user terminals may be configured to be in communication with the information processing system 230 through the network 220.

If an information processing system 230 provides an LLM-based service, it may receive a query from user terminals 210_1, 210_2, and 210_3. In this case, the information processing system 230 may generate an output for the query using the LLM. The information processing system 230 may transmit the LLM output for the query to the user terminals 210_1, 210_2, and 210_3.

Figure 3:
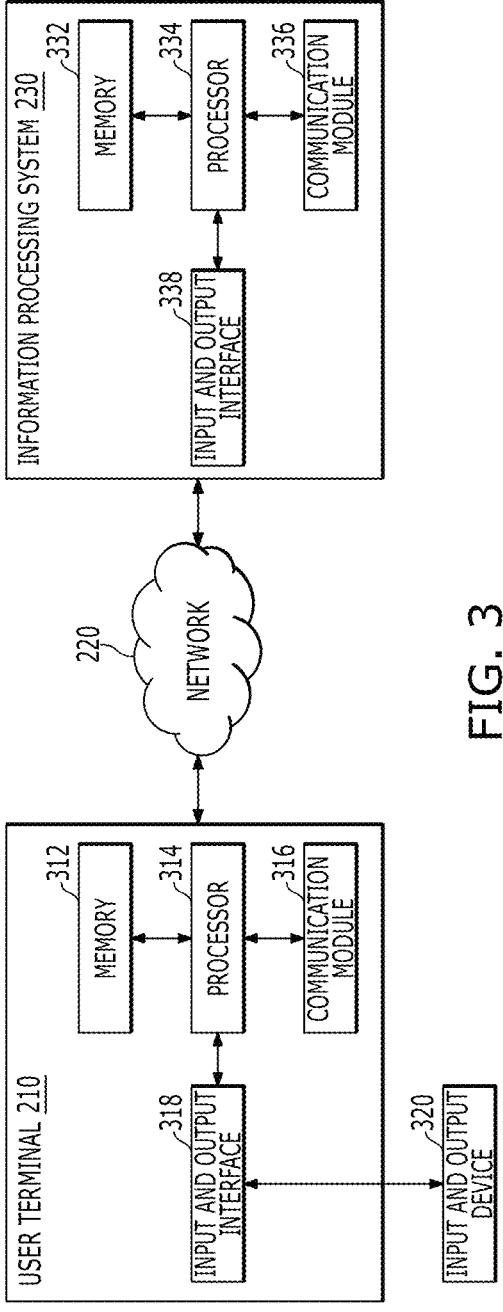
FIG. 3 is a block diagram of an internal configuration of a user terminal and an information processing system.

FIG. 3 is a block diagram of an internal configuration of a user terminal 210 and an information processing system 230. The user terminal 210 may refer to any computing device that is capable of executing the data processing application and so on and also capable of wired/wireless communication, and may include the mobile phone terminal 210_1, the tablet terminal 210_2, the PC terminal 210_3, and the like of FIG. 2, for example. As illustrated, the user terminal 210 may include a memory 312, a processor 314, a communication module 316, and an input and output interface 318. Likewise, the information processing system 230 may include a memory 332, a processor 334, a communication module 336, and an input and output interface 338. As illustrated in FIG. 3, the user terminal 210 and the information processing system 230 may be configured to communicate information and/or data through the network 220 using the respective communication modules 316 and 336. In addition, an input and output device 320 may be configured to input information and/or data to the user terminal 210 or to output information and/or data generated from the user terminal 210 through the input and output interface 318.

The memories 312 and 332 may include any non-transitory computer-readable recording medium. The memories 312 and 332 may include a permanent mass storage device such as random access memory (RAM), read only memory (ROM), disk drive, solid state drive (SSD), flash memory, and so on. As another example, a non-destructive mass storage device such as ROM, SSD, flash memory, disk drive, and so on may be included in the user terminal 210 or the information processing system 230 as a separate permanent storage device that is separate from the memory. In addition, an operating system and at least one program code (e.g., a code for an application associated with a data processing service and the like) may be stored in the memories 312 and 332.

These software components may be loaded from a computer-readable recording medium separate from the memories 312 and 332. Such a separate computer-readable recording medium may include a recording medium directly connectable to the user terminal 210 and the information processing system 230, and may include a computer-readable recording medium such as a floppy drive, a disk, a tape, a DVD/CD-ROM drive, a memory card, and so on, for example. As another example, the software components may be loaded into the memories 312 and 332 through the communication modules 316 and 336 rather than the computer-readable recording medium. For example, one or more programs may be loaded into the memories 312 and 332 based on a computer program (e.g., application associated with data processing service and the like) that is installed by the files provided by the developers or a file distribution system for distributing an installation file of the application through the network 220.

The processors 314 and 334 may be configured to process the instructions of the computer program by performing basic arithmetic, logic, and input and output operations. The instructions may be provided to the processors 314 and 334 from the memories 312 and 332 or the communication modules 316 and 336. For example, the processors 314 and 334 may be configured to execute the received instructions according to a program code stored in a recording device such as the memories 312 and 332.

The communication modules 316 and 336 may provide a configuration or function for the user terminal 210 and the information processing system 230 to communicate with each other through the network 220, and may provide a configuration or function for the user terminal 210 and/or the information processing system 230 to communicate with another user terminal or another system (e.g., a separate cloud system or the like). For example, a request or data (e.g., a request to process data or data, and the like) generated by the processor 314 of the user terminal 210 according to the program code stored in the recording device such as the memory 312 or the like may be transmitted to the information processing system 230 through the network 220 under the control of the communication module 316. Conversely, a control signal or a command provided under the control of the processor 334 of the information processing system 230 may be received by the user terminal 210 through the communication module 316 of the user terminal 210 through the communication module 336 and the network 220.

The input and output interface 318 may be a means for interfacing with the input and output device 320. As an example, the input device may include a device such as a camera including an audio sensor and/or an image sensor, a keyboard, a microphone, a mouse, and so on, and the output device may include a device such as a display, a speaker, a haptic feedback device, and so on. As another example, the input and output interface 318 may be a means for interfacing with a device such as a touch screen or the like that integrates a configuration or function for performing inputting and outputting. While FIG. 3 illustrates that the input and output device 320 is not included in the user terminal 210, aspects are not limited thereto, and the input and output device 320 may be configured as one device with the user terminal 210. In addition, the input and output interface 338 of the information processing system 230 may be a means for interfacing with a device (not illustrated) for inputting or outputting that may be connected to, or included in the information processing system 230. While FIG. 3 illustrates the input and output interfaces 318 and 338 as the components configured separately from the processors 314 and 334, aspects are not limited thereto, and the input and output interfaces 318 and 338 may be configured to be included in the processors 314 and 334.

The user terminal 210 and the information processing system 230 may include more than those components illustrated in FIG. 3. Meanwhile, most of the related components may not necessarily require exact illustration. The user terminal 210 may be implemented to include at least a part of the input and output device 320 described above. In addition, the user terminal 210 may further include other components such as a transceiver, a Global Positioning System (GPS) module, a camera, various sensors, a database, and the like. For example, if the user terminal 210 is a smartphone, it may generally include components included in the smartphone, and for example, it may be implemented such that various components such as an acceleration sensor, a gyro sensor, a microphone module, a camera module, various physical buttons, buttons using a touch panel, input and output ports, a vibrator for vibration, and so on are further included in the user terminal 210.

The processor 314 of the user terminal 210 may be configured to operate the data processing application or the web browser application for providing the data processing service. A program code associated with the above application may be loaded into the memory 312 of the user terminal 210. While the application is running, the processor 314 of the user terminal 210 may receive information and/or data provided from the input and output device 320 through the input and output interface 318 or receive information and/or data from the information processing system 230 through the communication module 316, and process the received information and/or data and store it in the memory 312. In addition, such information and/or data may be provided to the information processing system 230 through the communication module 316.

While the data processing application is running, the processor 314 may receive voice data, text, image, video, and the like input or selected through the input device such as a camera, a microphone, and the like that includes a touch screen, a keyboard, an audio sensor and/or an image sensor connected to the input and output interface 318, and store the received voice data, text, image, and/or video or the like in the memory 312, or provide it to the information processing system 230 through the communication module 316 and the network 220. The processor 314 may receive a user input inputted through the input device and provide data/request corresponding to the user input to the information processing system 230 through the network 230 and the communication module 316.

The processor 314 of the user terminal 210 may transmit and output the information and/or data to the input and output device 320 through the input and output interface 318. For example, the processor 314 of the user terminal 210 may output the processed information and/or data through the output device 320 such as a device capable of outputting a display (e.g., a touch screen, a display, and the like), a device capable of outputting a voice (e.g., speaker), and the like.

The processor 334 of the information processing system 230 may be configured to manage, process, and/or store information and/or data received from a plurality of user terminals 210 and/or a plurality of external systems. The information and/or data processed by the processor 334 may be provided to the user terminals 210 through the communication module 336 and the network 220.

Figure 4:
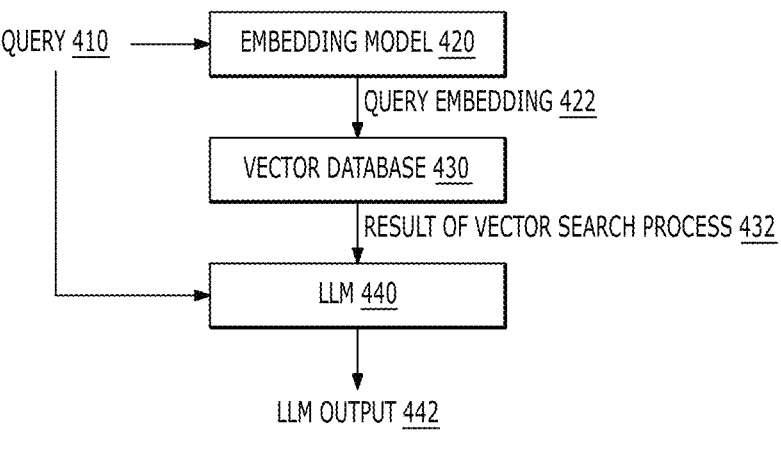
FIG. 4 is a diagram provided to explain a method for providing an LLM output through the data processing acceleration apparatus.

FIG. 4 is a diagram provided to explain a method for providing an LLM output through the data processing acceleration apparatus. Referring to FIG. 4, the data processing system (e.g., the information processing system of FIG. 2) may acquire and receive a query 410. For example, the host processor of the data processing system (e.g., the host processor 110 in FIG. 1) may acquire the query 410 from an external device connected through an input interface or a communication module of the data processing system. The host processor may acquire the query 410 from an external server that provides an interface (e.g., a web page) for processing the user's query 410.

The acquired query 410 may be converted into a vector including a series of numbers through the embedding process. For example, the query 410 may be converted into a query embedding 422 through an embedding model 420. The operation of converting into the query embedding 422 may be performed in the host processor. The operation of converting into the query embedding 422 may be performed in a hardware accelerator (e.g., the hardware accelerators 130 and 140 of FIG. 1) under the control of the host processor. The operation of converting into the query embedding 422 may be performed in the data processing acceleration apparatus. In this case, the host processor may transmit the acquired query 410 to the data processing acceleration apparatus, and the data processing acceleration apparatus receiving the query 410 may convert the query 410 into the query embedding 422 through the embedding model 420.

The converted vector may be transmitted to a vector database 430 and used for a search for the similar content. For example, a vector search process may be performed on the embedding vector data included in the vector database 430 based on the query embedding 422. This vector search operation may be performed in the data processing acceleration apparatus in consideration of search performance. For example, a plurality of computing units included in the memory controller (e.g., the memory controllers 150 and 170 of FIG. 1) of the data processing acceleration apparatus may search the vector database 430 stored in the memory device (e.g., the second memory devices 160 and 180 of FIG. 1) of the data processing acceleration apparatus based on the transmitted query so as to acquire data that meets the condition. The plurality of computing units may include one or more hardware devices configured to accelerate the vector search process on the vector database 430 stored in the memory device. In addition, the data processing acceleration apparatus may transmit a result 432 of the vector search process to the host processor or transmit the result 432 of the vector search process and the query embedding 422 to the hardware accelerator.

The result 432 of the vector search process may be transmitted together with the original query 410 as an input of an LLM 440. The LLM 440 may use the input data to generate an output (an LLM output 442) for the query 410. The LLM 440 service may be operated by a host processor, but most computational operations may be performed by a hardware accelerator, and the host processor may receive the LLM output 442 and transmit the same to the user (or user terminal). If the result 432 of the vector search process and the query embedding 422 are transmitted to the hardware accelerator, the hardware accelerator may generate the LLM output 442 based on the result 432 of the vector search process and the query embedding 422, and the memory controller may receive the LLM output 442 from the hardware accelerator and transmit the same to the host processor.

Additional information/up-to-date information may be updated in the vector database 430. In this case, the additional information/up-to-date information may be converted into an embedding by the embedding model 420, and the converted embedding may be stored in the vector database 430. With this configuration, the LLM 440 may provide the LLM output 442 reflecting the additional information/up-to-date information rather than the trained data.

Figure 5:
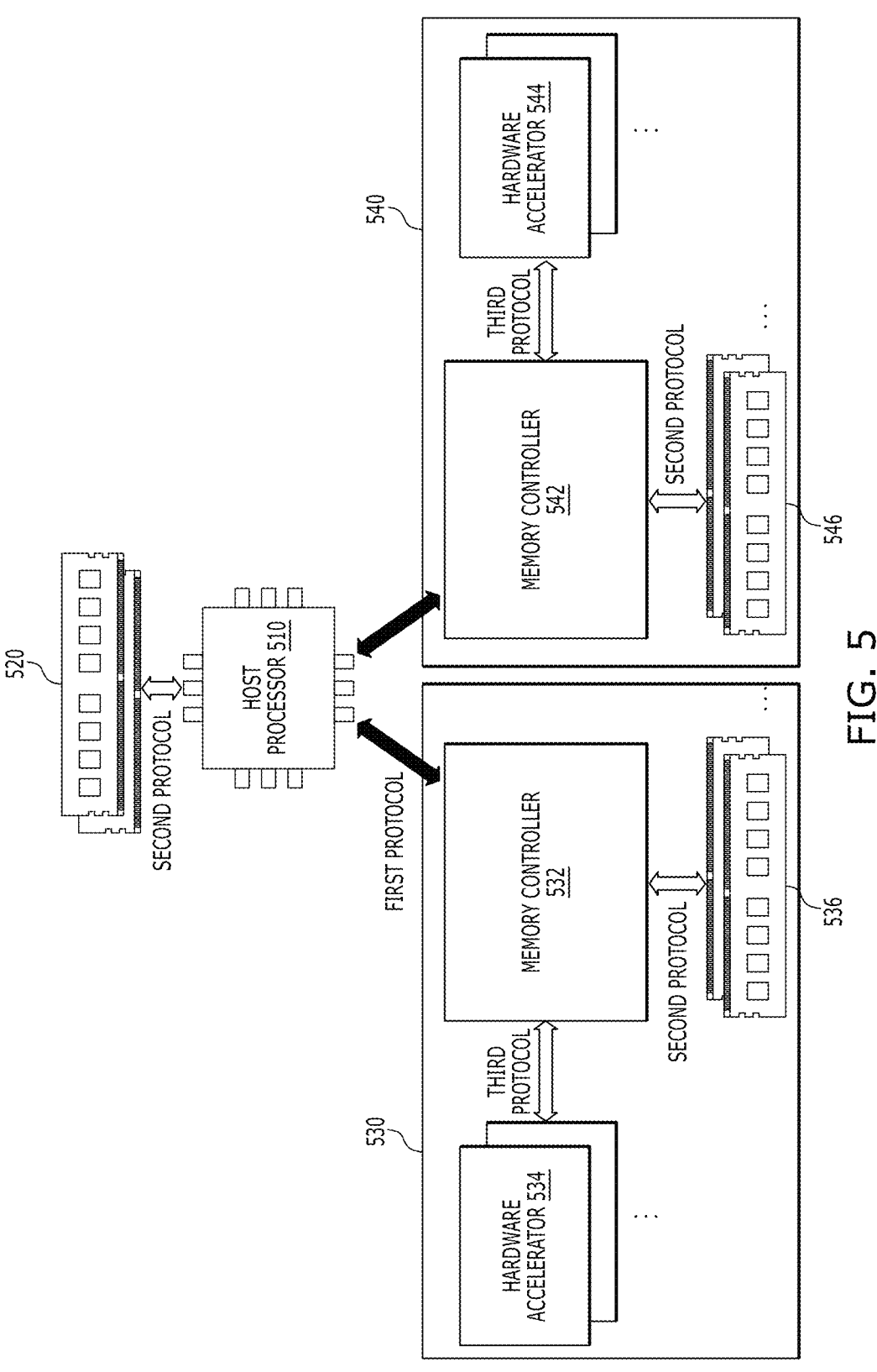
FIG. 5 is a diagram provided to explain a data processing system including data processing acceleration apparatuses including hardware accelerators.

FIG. 5 is a diagram provided to explain a data processing system including data processing acceleration apparatuses 530 and 540 including hardware accelerators 534 and 544. Integrating the hardware accelerator and the data processing acceleration apparatus may enhance the performance of processing the operation (e.g., LLM query) of the artificial intelligence model. To this end, referring to FIG. 5, the data processing system may include a host processor 510, one or more first memory devices 520, and one or more data processing acceleration apparatuses 530 and 540. Meanwhile, the configuration of the data processing system is not limited to the above. According to various aspects, the data processing system may omit one or more of the components described above, and may further include one or more other component. For example, the data processing system may further include a communication circuit for communication with an external device. The data processing system may be a server for providing an LLM-based service.

The host processor 510 may be a processor core configured to control overall operations of the data processing system. For example, the host processor 510 may be configured to interpret instructions of an operating system or various programs running on the data processing system and process data. The host processor 510 may be a CPU.

The one or more first memory devices 520 may store various data used by one or more components (e.g., the host processor 510) of the data processing system. For example, the data may include input data or output data for software (e.g., a program) and a command related to the same. The one or more first memory devices 520 may communicate with the host processor 510. The one or more first memory devices 520 may include a volatile memory and/or a non-volatile memory. The one or more first memory devices 520 may be a DIMM-based memory and may directly communicate with the host processor 510. For example, the one or more first memory devices 520 may include a memory that exchanges data through an interface based on a second protocol (e.g., a dual data rate (DDR) protocol). The one or more first memory devices 520 may be referred to as a "host memory".

The one or more data processing acceleration apparatuses 530 and 540 may operate under the control of the host processor 510. The one or more data processing acceleration apparatuses 530 and 540 may communicate with the host processor 510 through an interface based on a first protocol (e.g., CXL protocol). For example, the one or more data processing acceleration apparatuses 530 and 540 may be connected to the host processor 510 through an interface based on the CXL protocol. In addition, the one or more data processing acceleration apparatuses 530 and 540 may include second memory devices 536 and 546, and may perform an operation acceleration function on the corresponding memory device. In this case, the one or more data processing acceleration apparatuses 530 and 540 may be referred to as a "CXL computational memory".

The one or more data processing acceleration apparatuses 530 and 540 may include one or more hardware accelerators 534 and 544, one or more second memory devices 536 and 546, and memory controllers 532 and 542 configured to control the one or more second memory devices 536 and 546.

The one or more hardware accelerators 534 and 544 may include a hardware configuration for quickly and efficiently processing a specific task or operation in the data processing system. The one or more hardware accelerators 534 and 544 may include an operator or a processor configured to perform an artificial intelligence operation. For example, the one or more hardware accelerators 534 and 544 may include at least one of an NPU or a GPU configured to execute the LLM. The one or more hardware accelerators 534 and 544 may communicate with the memory controllers 532 and 542 through an interface based on a third protocol (e.g., PCIe, UCIe protocol, etc.).

The one or more second memory devices 536 and 546 may include a volatile memory and/or a non-volatile memory. The one or more second memory devices 536 and 546 may be a DIMM-based memory and may directly communicate with the memory controllers 532 and 542. For example, the one or more second memory devices 536 and 546 may include a memory that exchanges data through an interface based on the second protocol (e.g., a DDR protocol). The one or more second memory devices 536 and 546 may be referred to as a "device memory".

The one or more second memory devices 536 and 546 may store a vector database. The vector database may include embedding vector data associated with parameters of the LLM, latent variables of the LLM, and information (e.g., new information after LLM training) not used for training the LLM. In addition, the vector database may represent a database that stores and manages various information including additional information (e.g., up-to-date information) in the vector space, and may be mainly used for semantic search. For example, for the LLM, in order to receive additional information, a query may be converted into a vector in a numerical form that the model can understand, and a vector search may be performed on the vector database including information (e.g., new or up-to-date information) not used for training the LLM to find information with high similarity.

The memory controllers 532 and 542 may be configured to control the one or more second memory devices 536 and 546. To this end, the memory controllers 532 and 542 may include a plurality of computing units, a first interface configured to communicate with the host processor 510 based on the first protocol, a second interface configured to communicate with the one or more second memory devices 536 and 546 based on the second protocol, and a third interface configured to communicate with the one or more hardware accelerators 534 and 544 based on the third protocol.

The plurality of computing units may include one or more hardware devices configured to accelerate the vector search process on the vector database stored in the one or more second memory devices 536 and 546. The plurality of computing units may include a plurality of independent cores and accessory devices. In addition, the accessory device included in the plurality of computing units may include a hardware device that accelerates calculation of vector similarity, and may support some or all operations of vector similarity operation functions (e.g., a Euclidean similarity operation function or a cosine similarity operation function).

The memory controllers 532 and 542 may receive the query embedding from the host processor 510 through the first interface and perform a vector search process for the embedding vector data included in the vector database based on the query embedding. In addition, the memory controllers 532 and 542 may transmit the result of the vector search process to the host processor 510 through the first interface, or transmit the result of the vector search process and the query embedding to the hardware accelerators 534 and 544 through the third interface. The memory controllers 532 and 542 may transmit some of the parameters of the LLM, some of the latent variables of the LLM, the result of the vector search process, and the query embedding to the hardware accelerators 534 and 544 through the third interface. The hardware accelerators 534 and 544 may generate an output of the LLM based on some of the parameters of the received LLM, some of the latent variables of the LLM, the result of the vector search process, and the query embedding, which are transmitted as described above. In addition, the memory controllers 532 and 542 may receive the LLM output from the hardware accelerators 534 and 544 through the third interface and transmit the LLM output to the host processor 510 through the first interface.

Operations of updating the vector data and deleting some vector data for the vector database may be performed by the host processor 510.

In FIG. 5, the one or more hardware accelerators 534 and 544 are physically included in the data processing acceleration apparatus 530 and 540, but aspects are not limited thereto, and the one or more hardware accelerators 534 and 544 may be logically perceived as separate devices. For example, the memory controllers 532 and 542 of the data processing acceleration apparatuses 530 and 540 may be used as a bypass path of the one or more hardware accelerators 534 and 544.

In the operation (e.g., LLM query) of the artificial intelligence model in the data processing system including the data processing acceleration apparatuses 530 and 540 integrating the hardware accelerators 534 and 544 therein, first, a query may be input and transmitted to the host processor 510. The transmitted query may be converted into a vector form (query embedding) through the embedding process and transmitted to the data processing acceleration apparatuses 530 and 540. The data processing acceleration apparatuses 530 and 540 may perform a vector search using a plurality of computing units and a vector similarity acceleration function, and transmit the result together with the query to the hardware accelerators 534 and 544 that execute the LLM. The data processing acceleration apparatuses 530 and 540 may receive the LLM output from the hardware accelerators 534 and 544 and transmit the LLM output to the host processor 510. In this process, if there occurs another request for the vector search while the result according to the LLM algorithm is being generated, the another request may be directly transmitted to the data processing acceleration apparatuses 530 and 540 without passing through the host processor 510, which may provide a faster response.

Figure 6:
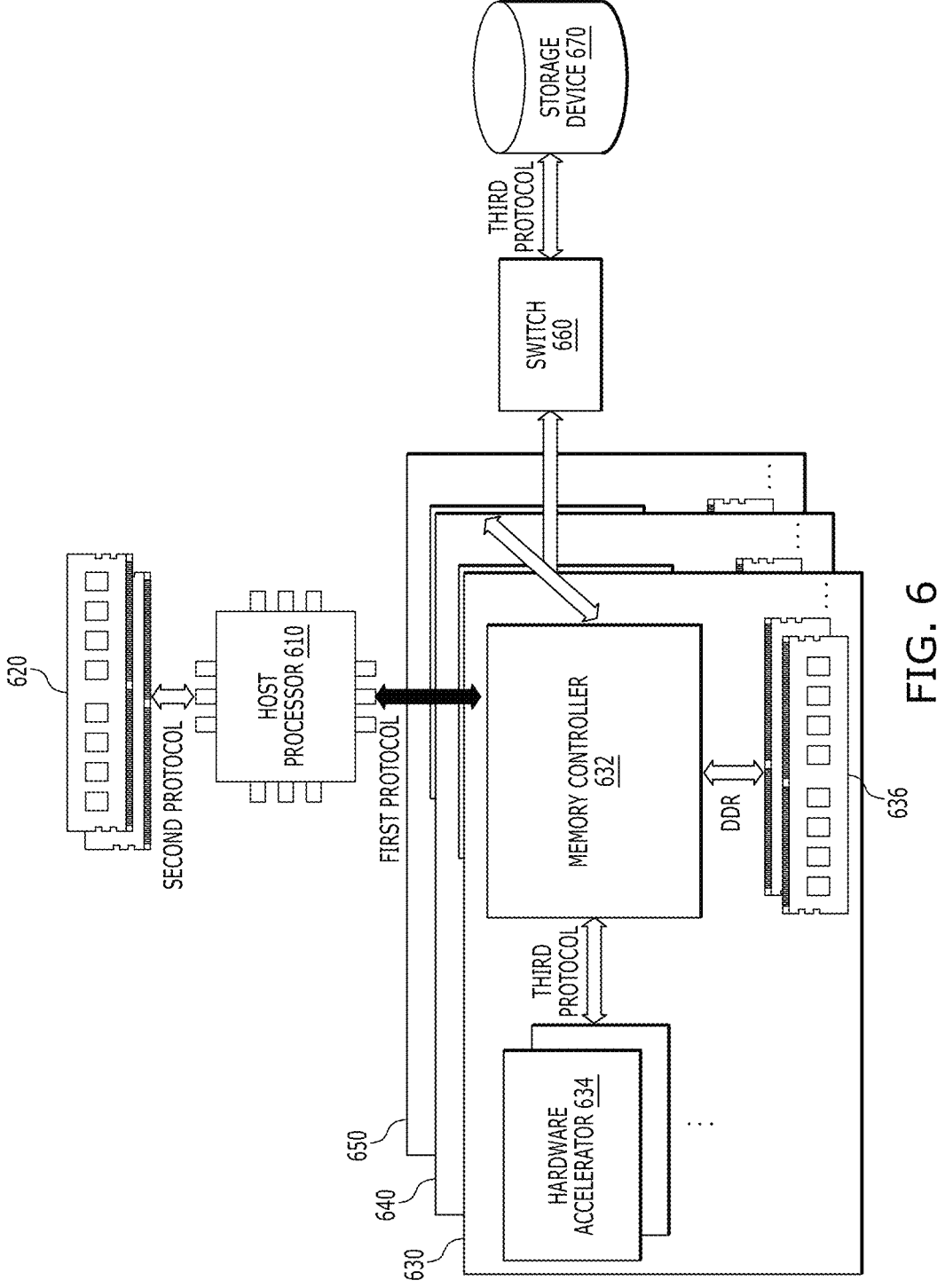
FIG. 6 is a diagram provided to explain a data processing system including data processing acceleration apparatuses connected to a storage device.

FIG. 6 is a diagram provided to explain a data processing system including data processing acceleration apparatuses 630, 640, and 650 connected to a storage device 670. The data processing system may include an increased number of data processing acceleration apparatuses to secure more storage space. Meanwhile, securing a storage space larger than a specified size by the method of increasing the number of data processing acceleration apparatus may be inefficient in terms of cost or performance. In this case, it is possible to increase the efficiency of the data processing system by using a structure in which a storage device is connected (or included) to the data processing acceleration apparatus. Referring to FIG. 6, such a data processing system may include a host processor 610, one or more first memory devices 620, one or more data processing acceleration apparatuses 630, 640, and 650, and the storage device 670 connected to the one or more data processing acceleration apparatuses 630, 640, and 650 through a switch 660. Meanwhile, the configuration of the data processing system is not limited to the above. According to various aspects, the data processing system may omit at least one of the components described above, and may further include at least one other component. For example, the data processing system may further include a communication circuit for communication with an external device. The data processing system may be a server for providing an LLM-based service.

The host processor 610 may be a processor core configured to control overall operations of the data processing system. For example, the host processor 610 may be configured to interpret instructions of an operating system or various programs running on the data processing system and process data. The host processor 610 may be a CPU.

The one or more first memory devices 620 may store various data used by one or more components (e.g., the host processor 610) of the data processing system. For example, the data may include input data or output data for software (e.g., a program) and a command related to the same. The one or more first memory devices 620 may communicate with the host processor 610. The one or more first memory devices 620 may include a volatile memory and/or a nonvolatile memory. The one or more first memory devices 620 may be a DIMM-based memory and may directly communicate with the host processor 610. For example, the one or more first memory devices 620 may include a memory that exchanges data through an interface based on a second protocol (e.g., a dual data rate (DDR) protocol). The one or more first memory devices 620 may be referred to as a "host memory".

The one or more data processing acceleration apparatuses 630, 640, and 650 may operate under the control of the host processor 610. The one or more data processing acceleration apparatuses 630, 640, and 650 may communicate with the host processor 610 through an interface based on a first protocol (e.g., a CXL protocol). For example, the one or more data processing acceleration apparatuses 630, 640 and 650 may be connected to the host processor 610 through an interface based on the CXL protocol. In addition, the one or more data processing acceleration apparatuses 630, 640, and 650 may include second memory devices 636, and may perform an operation acceleration function on the corresponding memory device. In this case, the one or more data processing acceleration apparatuses 630, 640 and 650 may be referred to as a "CXL computational memory".

The one or more data processing acceleration apparatuses 630, 640, and 650 may include one or more hardware accelerators 634, one or more second memory devices 636, and memory controllers 632 configured to control the one or more second memory devices 636.

The one or more hardware accelerators 634 may include a hardware configuration for quickly and efficiently processing a specific task or operation in the data processing system. The one or more hardware accelerators 634 may include an operator or a processor configured to perform an artificial intelligence operation. For example, the one or more hardware accelerators 634 may include at least one of an NPU or GPU configured to execute the LLM. The one or more hardware accelerators 634 may communicate with the memory controllers 632 through an interface based on a third protocol (e.g., PCIe, UCIe protocol, etc.).

The one or more second memory devices 636 may include a volatile memory and/or a non-volatile memory. The one or more second memory devices 636 may be a DIMM-based memory and may directly communicate with the memory controllers 632. For example, the one or more second memory devices 636 may include a memory that exchanges data through an interface based on a second protocol (e.g., a DDR protocol). The one or more second memory devices 636 may be referred to as a device memory.

The memory controllers 632 may be configured to control the one or more second memory devices 636. To this end, the memory controllers 632 may include a plurality of computing units, a first interface configured to communicate with the host processor 610 based on the first protocol, a second interface configured to communicate with the one or more second memory devices 636 based on the second protocol, and a third interface configured to communicate with the one or more hardware accelerators 634 based on the third protocol.

The plurality of computing units may include one or more hardware devices configured to accelerate the vector search process on the vector database. The plurality of computing units may include a plurality of independent cores and accessory devices. In addition, the accessory device included in the plurality of computing units may include a hardware device that accelerates calculation of vector similarity, and may support some or all operations of vector similarity operation functions (e.g., a Euclidean similarity operation function or a cosine similarity operation function).

The vector database may be stored in the storage device 670. For example, the storage device 670 connected to the one or more data processing acceleration apparatuses 630, 640, and 650 through the switch 660 may store the vector database. The storage device 670 may include a volatile memory and/or a non-volatile memory. The storage device 670 may include at least one of a Solid State Drive (SSD) or a Hard Disk Drive (HDD). The vector database may include embedding vector data associated with parameters of the LLM, latent variables of the LLM, and information (e.g., new information after LLM training) not used for training the LLM. In addition, the vector database may represent a database that stores and manages various information including additional information (e.g., up-to-date information) in the vector space, and may be mainly used for semantic search. For example, for the LLM, in order to receive additional information, a query may be converted into a vector in a numerical form that the model can understand, and a vector search may be performed on the vector database including information (e.g., new or up-to-date information) not used for training the LLM to find information with high similarity.

The memory controllers 632 may receive the query embedding from the host processor 610 through the first interface and perform a vector search process for the embedding vector data included in the vector database based on the query embedding. In addition, the memory controllers 632 may transmit the result of the vector search process to the host processor 610 through the first interface, or transmit the result of the vector search process and the query embedding to the hardware accelerators 634 through the third interface. The memory controllers 632 may transmit some of the parameters of the LLM, some of the latent variables of the LLM, the result of the vector search process, and the query embedding to the hardware accelerators 634 through the third interface. The hardware accelerators 634 may generate an output of the LLM based on some of the parameters of the received LLM, some of the latent variables of the LLM, the result of the vector search process, and the query embedding, which are transmitted as described above. In addition, the memory controllers 632 may receive the LLM output from the hardware accelerators 634 through the third interface and transmit the LLM output to the host processor 610 through the first interface.

The host processor 610 may perceive a storage capacity of the storage device 670 as a storage capacity of the data processing acceleration apparatuses 630, 640, and 650, and may process so that the memory controllers 632 of the data processing acceleration apparatuses 630, 640, and 650 may read and write to the storage device 670 like a memory through address conversion. In this case, the second memory devices 636 included in the data processing acceleration apparatuses 630, 640, and 650 may operate as a cache for the storage device 670. Accordingly, frequently referenced vector data of the vector data stored in the storage device 670 may be stored in the second memory devices 636 with a high probability, thus allowing a quick access to the corresponding data.

During the vector search operation on the vector database, each of the data processing acceleration apparatuses 630, 640, and 650 may share and perceive the storage capacity of the storage device 670, and the vector data may operate in a read-only mode. Accordingly, the data processing acceleration apparatuses 630, 640, and 650 may perform any pointer search operation on the storage capacity of the storage device 670. Meanwhile, for an update operation (e.g., an operation of adding, deleting, or changing vector data) on the vector database, it may be controlled not to be performed simultaneously with the pointer search operation so as to ensure the stability and consistency of the linked list-based data structure. To this end, any one data processing acceleration apparatus (e.g., the data processing acceleration apparatus 630) may be set as a master device, and the other data processing acceleration apparatuses (e.g., the data processing acceleration apparatus 640 and the data processing acceleration apparatus 650) may be set as subordinate devices. In this case, the host processor 610 may update the vector database stored in the storage device 670 through a memory controller (e.g., the memory controllers 632) of the data processing acceleration apparatus set as the master device, and control the memory controllers of the data processing acceleration apparatuses set as the subordinate devices not to perform read and write operations on the vector database stored in the storage device 670. That is, the read and write operations on the vector database stored in the storage device 670 of the memory controllers of the data processing acceleration apparatuses set as the subordinate devices may be prohibited.

The structure in which the storage device 670 is connected to the one or more data processing acceleration apparatuses 630, 640, and 650 through the switch 660 has been described above, but aspects are not limited thereto. According to various aspects, the storage device 670 may be connected to the one or more data processing acceleration apparatuses 630, 640, and 650 through the switch 660, and may be integrated into one or more data processing acceleration apparatuses 630, 640, and 650 as a module. For example, the one or more data processing acceleration apparatuses 630, 640, and 650 may include the storage device 670.

Figure 7:
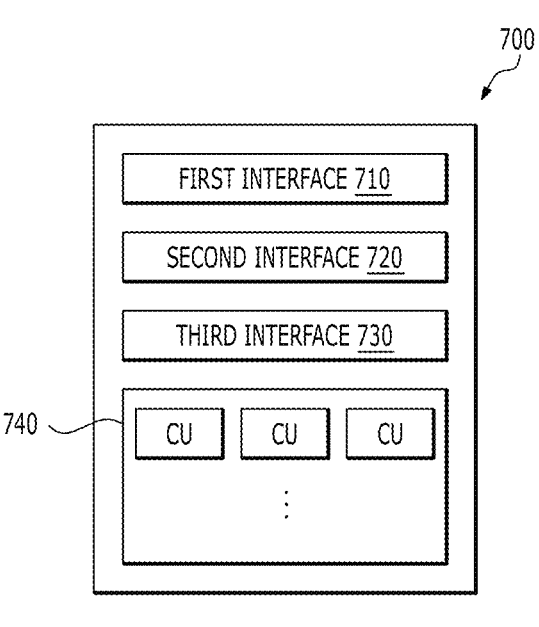
FIG. 7 is a diagram provided to explain a configuration of a memory controller included in a data processing acceleration apparatus.

FIG. 7 is a diagram provided to explain a configuration of a memory controller 700 included in a data processing acceleration apparatus. Referring to FIG. 7, the memory controller 700 (e.g., the memory controllers 150 and 170 in FIG. 1, the memory controllers 532 and 542 of FIG. 5, or the memory controllers 632 of FIG. 6) included in the data processing acceleration apparatus (e.g., the data processing acceleration apparatuses 530 and 540 in FIG. 5 or the data processing acceleration apparatuses 630, 640, and 650 in FIG. 6) may include a plurality of interfaces (e.g., a first interface 710, a second interface 720, and/or a third interface 730), and a plurality of computing units 740. The drawing illustrates a structure in which the memory controller 700 includes the first interface 710, the second interface 720, and the third interface 730, but the number of interfaces is not limited thereto. In addition, the memory controller 700 may further include one or more other components in addition to the components described above. For example, the memory controller 700 may further include a thread manager, a program memory, an auxiliary processor, a cache memory, a memory manager, a storage controller, etc.

A plurality of interfaces may support communication between the memory controller 700 and an external device. The memory controller 700 may communicate with a host processor (e.g., the host processor 110 of FIG. 1, the host processor 510 of FIG. 5, or the host processor 610 of FIG. 6) outside the data processing acceleration apparatus through the first interface 710. The memory controller 700 may communicate with an internal memory device (e.g., the memory devices 160 and 180 of FIG. 1, the memory devices 536 and 546 of FIG. 5, or the memory devices 636 of FIG. 6) of the data processing acceleration apparatus through the second interface 720. The memory controller 700 may communicate with an internal hardware accelerator (e.g., the hardware accelerators 534 and 544 of FIG. 5 or the hardware accelerators 634 of FIG. 6) of the data processing acceleration apparatus through the third interface 730.

The first interface 710 may include a CXL interface. The second interface 720 may include a DDR interface. The third interface 730 may include at least one of a PCIe interface and a UCIe interface.

The plurality of computing units 740 may include one or more hardware devices configured to accelerate the vector search process on the vector database. The plurality of computing units 740 may include a plurality of independent cores and accessory devices. In addition, the accessory device included in the plurality of computing units 740 may include a hardware device that accelerates calculation of vector similarity, and may support some or all operations of vector similarity operation functions (e.g., a Euclidean similarity operation function or a cosine similarity operation function).

The memory controller 700 may receive the query embedding from the host processor through the first interface 710 and perform a vector search process for the embedding vector data included in the vector database based on the query embedding. In addition, the memory controller 700 may transmit the result of the vector search process to the host processor through the first interface 710, or transmit the result of the vector search process and the query embedding to the hardware accelerator through the third interface 730. The memory controller 700 may transmit some of the parameters of the LLM, some of the latent variables of the LLM, the result of the vector search process, and the query embedding to the hardware accelerator through the third interface 730. The hardware accelerator may generate an LLM output based on some of the parameters of the received LLM, some of the latent variables of the LLM, the result of the vector search process, and the query embedding, which are transmitted as described above. In addition, the memory controller 700 may receive the LLM output from the hardware accelerator through the third interface 730 and transmit the LLM output to the host processor through the first interface 710.

Figure 8:
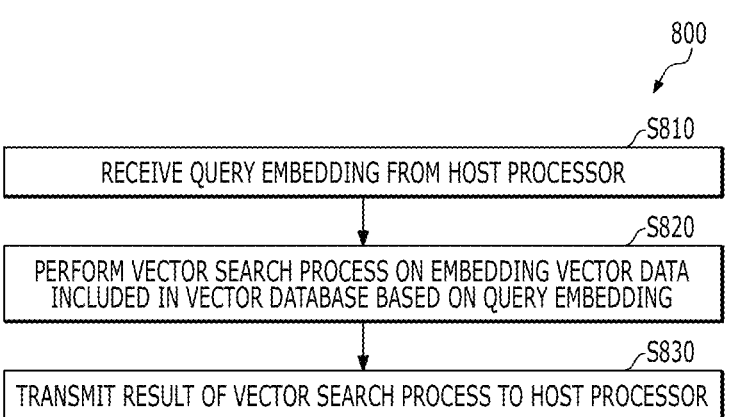
FIG. 8 is a diagram provided to explain a method for processing a search for data included in a database associated with an artificial intelligence model.

FIG. 8 is a diagram provided to explain a method for processing a search for data included in a database associated with an artificial intelligence model. Referring to FIG. 8, the memory controller 700 (e.g., the memory controllers 150 and 170 in FIG. 1, the memory controllers 532 and 542 of FIG. 5, or the memory controllers 632 of FIG. 6) included in the data processing acceleration apparatus (e.g., the data processing acceleration apparatuses 530 and 540 in FIG. 5 or the data processing acceleration apparatuses 630, 640, and 650 in FIG. 6) may receive a query embedding from the host processor (e.g., the host processor 110 of FIG. 1, the host processor 510 of FIG. 5, or the host processor 610 of FIG. 6), at S810. For example, the memory controller may receive the query embedding from the host processor through a first interface (e.g., the first interface 710 in FIG. 7). Alternatively, the memory controller may receive a query from the host processor and convert the query into a query embedding.

At S820, the memory controller may perform a vector search process for the embedding vector data included in the vector database based on the query embedding.

At S830, the memory controller may transmit the result of the vector search process to the host processor. For example, the memory controller may transmit the result of the vector search process to the host processor through the first interface.

The host processor may transmit the result of the vector search process and the query embedding to the hardware accelerator (e.g., the hardware accelerators 130 and 140 of FIG. 1). In addition, the hardware accelerator may generate an LLM output and transmit the LLM output to the host processor.

FIG. 9 is a diagram provided to explain a method for processing a search for data included in a database associated with an artificial intelligence model and outputting from an LLM. Referring to FIG. 9, the memory controller 700 (e.g., the memory controllers 150 and 170 in FIG. 1, the memory controllers 532 and 542 of FIG. 5, or the memory controllers 632 of FIG. 6) included in the data processing acceleration apparatus (e.g., the data processing acceleration apparatuses 530 and 540 in FIG. 5 or the data processing acceleration apparatuses 630, 640, and 650 in FIG. 6) may receive a query embedding from the host processor (e.g., the host processor 110 of FIG. 1, the host processor 510 of FIG. 5, or the host processor 610 of FIG. 6), at S910. For example, the memory controller may receive the query embedding from the host processor through a first interface (e.g., the first interface 710 in FIG. 7). Alternatively, the memory controller may receive a query from the host processor and convert the query into a query embedding.

At S920, the memory controller may perform a vector search process for the embedding vector data included in the vector database based on the query embedding.

At S930, the memory controller may transmit some of the parameters of the LLM, some of the latent variables of the LLM, the result of the vector search process, and the query embedding to the hardware accelerator (e.g., the hardware accelerators 534 and 544 of FIG. 5 or the hardware accelerators 634 of FIG. 6). For example, the memory controller may transmit some of the parameters of the LLM, some of the latent variables of the LLM, the result of the vector search process, and the query embedding to the hardware accelerator through a third interface (e.g., the third interface 730 in FIG. 7).

The hardware accelerator may generate an output of the LLM based on some of the parameters of the received LLM, some of the latent variables of the LLM, the result of the vector search process, and the query embedding.

At S940, the memory controller may receive the LLM output from the hardware accelerator. For example, the memory controller may receive the LLM output from the hardware accelerator through a third interface.

At S950, the memory controller may transmit the LLM output to the host processor. For example, the memory controller may transmit the LLM output to the host processor through the first interface.

The flowchart and description above are merely examples and may be implemented differently in some examples. For example, in some examples, the order of respective steps may be changed, some steps may be repeatedly performed, some steps may be omitted, or some steps may be added.

The method described above may be provided as a computer program stored in a computer-readable recording medium for execution on a computer. The medium may be a type of medium that continuously stores a program executable by a computer, or temporarily stores the program for execution or download. In addition, the medium may be a variety of recording means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, etc. In addition, other examples of the medium may include an app store that distributes applications, a site that supplies or distributes various software, and a recording medium or a storage medium managed by a server.

The methods, operations, or techniques of the present disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies depending on design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the present disclosure, computer, or a combination thereof.

Accordingly, various example logic blocks, modules, and circuits described in connection with the present disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, etc. The instructions may be executable by one or more processors, and may cause the processor(s) to perform certain aspects of the functions described in the present disclosure.

When implemented in software, the techniques may be stored on a computer-readable medium as one or more instructions or codes, or may be transmitted through a computer-readable medium. The computer-readable media include both the computer storage media and the communication media including any medium that facilitates the transmission of a computer program from one place to another. The storage media may also be any available media that may be accessible to a computer. By way of non-limiting example, such a computer-readable medium may include RAM, ROM, EEPROM, CD-ROM or other optical disk storage, magnetic disk storage or other magnetic storage devices, or any other media that can be used to transmit or store desired program code in the form of instructions or data structures and can be accessible to a computer. In addition, any connection is properly referred to as a computer-readable medium.

For example, if the software is sent from a website, server, or other remote sources using coaxial cable, fiber optic cable, twisted pair, digital subscriber line (DSL), or wireless technologies such as infrared, wireless, and microwave, the coaxial cable, the fiber optic cable, the twisted pair, the digital subscriber line, or the wireless technologies such as infrared, wireless, and microwave are included within the definition of the medium. The disks and the discs used herein include CDs, laser disks, optical disks, digital versatile discs (DVDs), floppy disks, and Blu-ray disks, where disks usually magnetically reproduce data, while discs optically reproduce data using a laser. The combinations described above should also be included within the scope of the computer-readable media.

The software module may reside in RAM memory, flash memory, ROM memory, EPROM memory, EEPROM memory, registers, hard disk, removable disk, CD-ROM, or any other form of storage medium known. An exemplary storage medium may be connected to the processor such that the processor may read or write information from or to the storage medium. Alternatively, the storage medium may be integrated into the processor. The processor and the storage medium may exist in the ASIC. The ASIC may exist in the user terminal. Alternatively, the processor and storage medium may exist as separate components in the user terminal.

Although the examples described above have been described as utilizing aspects of the currently disclosed subject matter in one or more standalone computer systems, aspects are not limited thereto, and may be implemented in conjunction with any computing environment, such as a network or distributed computing environment. Furthermore, the aspects of the subject matter in the present disclosure may be implemented in multiple processing chips or apparatus, and storage may be similarly influenced across a plurality of apparatus. Such apparatus may include PCs, network servers, and portable apparatus.

Although the present disclosure has been described in connection with some examples herein, various modifications and changes can be made without departing from the scope of the present disclosure, which can be understood by those skilled in the art to which the present disclosure pertains. In addition, such modifications and changes should be considered within the scope of the claims appended herein.

The invention claimed is:

1. A data processing acceleration apparatus, comprising:
a hardware accelerator, which is at least one of a Neural Processing Unit (NPU) or a Graphic Processing Unit (GPU) configured to execute a Large Language Model (LLM);
a memory device configured to store a vector database, which includes parameters of the LLM, latent variables of the LLM, and embedding vector data associated with information not used for training the LLM, wherein the memory device comprises a first memory device and a second memory device; and
a memory controller configured to control the hardware accelerator and the second memory device, wherein the memory controller comprises:
a plurality of computing units comprising a plurality of independent cores, each of which is configured to perform an independent pointer search, and accessory devices, each of which includes a hardware device configured to accelerate calculation of vector similarity;
a first interface, which is a Compute eXpress Link (CXL) interface configured to communicate with a host processor based on a first protocol, which is a CXL protocol;
a second interface, which is a Dual Data Rate (DDR) interface configured to communicate with the second memory device based on a second protocol, which is a DDR protocol; and
a third interface, which is a Peripheral Component Interconnect Express (PCIe) interface or a Universal Chiplet Interconnect Express (UCIe) interface configured to communicate with the hardware accelerator based on a third protocol, which is a PCIe protocol or a UCIe protocol,
wherein the first memory device is a first dual in-line memory module (DIMM)-based memory which is configured to directly communicate with the host processor based on the DDR protocol and is configured to indirectly communicate with the hardware accelerator via the memory controller based on the CXL protocol,
wherein the second memory device is a second DIMM-based memory which is configured to indirectly communicate with the host processor via the memory controller and is configured to directly communicate with the memory controller that is configured to directly communicate with the hardware accelerator based on the PCIe protocol or the UCIe protocol,
wherein the second memory device has a higher latency than the first memory device, and
wherein, while a result according to an LLM algorithm is being generated by the hardware accelerator, another request for a vector search is directly transmitted to the hardware accelerator without passing through the host processor;
wherein the memory controller is configured to:
receive a query embedding from the host processor through the first interface;
perform a vector search process for the embedding vector data included in the vector database based on the query embedding; and
transmit some of the parameters of the LLM, some of the latent variables of the LLM, a result of the vector search process, and the query embedding to the hardware accelerator through the third interface, and
the hardware accelerator is configured to generate an output of the LLM based on some of the parameters of the LLM, some of the latent variables of the LLM, the result of the vector search process, and the query embedding.

2. The data processing acceleration apparatus according to claim 1, wherein the memory controller is configured to:
receive a query embedding from the host processor through the first interface;
perform a vector search process on a vector database stored in the memory device based on the query embedding; and transmit a result of the vector search process to the host processor through the first interface, or transmit the result of the vector search process and the query embedding to the hardware accelerator through the third interface.

3. The data processing acceleration apparatus according to claim 2, wherein the hardware accelerator is configured to generate an output of a Large Language Model (LLM) based on the result of the vector search process and the query embedding, and the memory controller is configured to:

receive the output of the LLM from the hardware accelerator through the third interface;

and transmit the output of the LLM to the host processor through the first interface.

4. The data processing acceleration apparatus according to claim 1, wherein an operation of updating vector data and deleting some vector data for the vector database is performed by the host processor.

5. The data processing acceleration apparatus according to claim 1, further comprising a storage device, wherein the memory controller further includes a fourth interface configured to communicate with the storage device based on a fourth protocol, the storage device stores a vector database, and the memory device operates as a cache for the storage device.

6. The data processing acceleration apparatus according to claim 5, further comprising:

an additional hardware accelerator;

an additional memory device; and an additional memory controller configured to control the additional hardware accelerator and the additional memory device, wherein the additional memory controller includes: a plurality of additional computing units;

a fifth interface configured to communicate with the host processor based on the first protocol;

a sixth interface configured to communicate with the additional memory device based on the second protocol;

a seventh interface configured to communicate with the additional hardware accelerator based on the third protocol; and an eighth interface configured to communicate with the storage device based on the fourth protocol, and the additional memory device operates as a cache for the storage device.

7. The data processing acceleration apparatus according to claim 6, wherein, if at least one of the memory controller or the additional memory controller performs a vector search process on a vector database stored in the storage device, vector data stored in the vector database operates in a read-only mode.

8. The data processing acceleration apparatus according to claim 6, wherein, if the host processor updates a vector database stored in the storage device, the memory controller operates as a master device, and the additional memory controller operates as a subordinate device, the host processor updates the vector database stored in the storage device through the memory controller, and reading and writing operations with respect to the vector database stored in the storage device of the additional memory controller are prohibited.

* * * * *